US010655724B2

(12) United States Patent
Manzoor

(10) Patent No.: US 10,655,724 B2
(45) Date of Patent: May 19, 2020

(54) ASYMMETRIC SPOKE DESIGN FOR TORSIONAL VIBRATION DAMPERS

(71) Applicant: Suhale Manzoor, Plymouth, MI (US)

(72) Inventor: Suhale Manzoor, Plymouth, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 326 days.

(21) Appl. No.: 15/495,476

(22) Filed: Apr. 24, 2017

(65) Prior Publication Data

US 2017/0314637 A1     Nov. 2, 2017

Related U.S. Application Data

(60) Provisional application No. 62/328,318, filed on Apr. 27, 2016.

(51) Int. Cl.
| | | |
|---|---|---|
| *F16H 55/40* | (2006.01) | |
| *F16F 15/126* | (2006.01) | |
| *F16F 15/14* | (2006.01) | |
| *F16H 55/36* | (2006.01) | |
| *F16H 7/08* | (2006.01) | |

(52) U.S. Cl.
CPC ........... *F16H 55/40* (2013.01); *F16F 15/126* (2013.01); *F16F 15/1442* (2013.01); *F16H 55/36* (2013.01); *F16F 2222/08* (2013.01); *F16H 2007/087* (2013.01); *F16H 2007/0865* (2013.01); *F16H 2055/366* (2013.01)

(58) Field of Classification Search
CPC .... F16H 55/40; F16H 55/48; F16H 2055/366; F16H 2007/0865; F16H 2007/087; F16H 55/42; F16H 55/44; F16H 7/12; F16H 7/1209; F16H 7/20; F16H 55/36; F16H 55/49; F16H 55/52; F16H 55/54; F16H 55/56; F16H 55/59; F16D 1/0852; F16D 1/0864; F16D 1/087
USPC ..................................... 474/94, 195
See application file for complete search history.

(56) References Cited

U.S. PATENT DOCUMENTS

| | | | | |
|---|---|---|---|---|
| 917,479 | A | * 4/1909 | Noble ...................... | B62J 99/00 301/104 |
| 1,426,339 | A | 8/1922 | Sperry | |
| 4,973,292 | A | * 11/1990 | Mevissen ................ | F16H 55/36 474/192 |

(Continued)

FOREIGN PATENT DOCUMENTS

| | | |
|---|---|---|
| DE | 2930244 | 2/1981 |
| WO | 15128595 | 9/2015 |

*Primary Examiner* — Michael R Mansen
*Assistant Examiner* — Raveen J Dias
(74) *Attorney, Agent, or Firm* — FisherBroyles, LLP; Susan M. Oiler

(57) ABSTRACT

Torsional vibration dampers (TVDs) having a plurality of spokes that are asymmetric by having a changing spoke thickness in the angular direction with the greatest thickness at the position where the belt torque and the dynamic torque of the TVD act in unison are disclosed. The spokes, which connect a central member to a peripheral rim, include an asymmetrical thickness in an angular direction, as evidenced by a cross-section view transverse to a radial length of each of the plurality of spokes. Engine systems having one of the disclosed TVDs mounted to a shaft are also disclosed, for example a TVD mounted to a crankshaft.

9 Claims, 4 Drawing Sheets
(1 of 4 Drawing Sheet(s) Filed in Color)

(56) References Cited

U.S. PATENT DOCUMENTS

| | | | |
|---|---|---|---|
| 5,606,890 A * | 3/1997 | Luckas | F16D 3/68 |
| | | | 464/89 |
| 5,630,769 A * | 5/1997 | Schmidt | B60B 5/02 |
| | | | 474/167 |
| 6,216,327 B1 | 4/2001 | Hendrian | |
| 8,091,450 B2 | 1/2012 | Manzoor et al. | |
| 8,117,943 B2 | 2/2012 | Manzoor | |
| 8,496,552 B2 | 7/2013 | Kvasnicka et al. | |
| 2003/0113209 A1* | 6/2003 | Wasson | F04D 29/282 |
| | | | 416/60 |
| 2003/0168904 A1* | 9/2003 | Frigo | A63C 17/22 |
| | | | 301/5.307 |
| 2005/0204858 A1* | 9/2005 | Grist | F16F 15/126 |
| | | | 74/574.4 |
| 2008/0034918 A1 | 2/2008 | Manzoor et al. | |
| 2008/0219607 A1* | 9/2008 | Murao | B29C 45/0046 |
| | | | 384/417 |
| 2011/0300979 A1* | 12/2011 | Dutil | F16H 55/36 |
| | | | 474/166 |
| 2012/0149511 A1* | 6/2012 | Hodjat | F16D 3/10 |
| | | | 474/94 |
| 2014/0155210 A1* | 6/2014 | Ichikawa | F16H 55/48 |
| | | | 474/174 |
| 2015/0226310 A1* | 8/2015 | Schubert | F16H 55/40 |
| | | | 254/390 |
| 2016/0010730 A1* | 1/2016 | Ziliak | F16G 1/08 |
| | | | 474/153 |
| 2017/0059028 A1 | 3/2017 | Manzoor | |

* cited by examiner

Convention Spoke, Maximum Principle Stress = 121 MPa

Asymmetric Spoke, Maximum Principle Stress = 103 MPa

ASYMMETRIC SPOKE DESIGN FOR TORSIONAL VIBRATION DAMPERS

RELATED APPLICATION

This application claims the benefit of U.S. Provisional Application 62/328,318, filed Apr. 27, 2016, the entirety of which is incorporated herein by reference.

TECHNICAL FIELD

The present invention relates to torsional vibration dampers for vehicle powertrains and drivetrains and, more particularly, to torsional vibration damper hubs having asymmetric spokes, the asymmetry being a changing thickness in the angular direction.

BACKGROUND

Torsional Vibration Dampers (TVDs) are useful in attenuating torsional vibrations inherent to rotating shafts, including but not limited to crankshafts, drive-shafts, prop-shafts, and half-shafts utilized in automotive and non-automotive applications. Commonly, a TVD consists of three components: (1) a rigid metallic bracket (hub) attaching the TVD to the rotating shaft with the vibratory problem; (2) an active inertia member (ring) oscillating opposite in phase to the vibrating shaft at a particular frequency, thereby reducing the resulting magnitude of the shaft vibration; and (3) an elastomeric member (strip) with two functions: (a) providing a spring damper, thereby tuning the TVD to a particular frequency; and (b) locating the hub and the ring with respect to each other in the TVD.

The hub of a TVD consists of a central bore that connects the TVD to the vibratory shaft, an outer flange that provides a mating surface for the elastomer member, and a plurality of spokes that connect the central bore to the outer flange. The hub of the damper is a structural bracket, and its associated mass and inertia have no bearing on attenuating the vibration in the system. Spoke design is therefore a balance between giving the hub adequate structural strength and noise, vibration, and harshness (NVH) stability and minimizing the amount of material used, thereby reducing the parasitic inertia and mass thereof. Two traditional styles of spokes are commonly employed in hub design—rectangular beam and I-beam spokes.

Changes in TVD designs are always sought after that will reduce the mass of the TVD and/or improve the performance thereof.

SUMMARY

The present disclosure is directed to asymmetrical spoke designs for the hub of torsional vibration dampers. The torsional vibration damper also includes an inertia member concentric about the hub with an elastomeric member operatively positioned therebetween. The hubs disclosed herein have a plurality of spokes extending from an outer radial surface of a central member to an inner radial surface of a peripheral rim. Each of the plurality of spokes has an asymmetrical thickness in an angular direction, as evidenced by a cross-section view transverse to a radial length of each of the plurality of spokes. This asymmetrical thickness is greatest where the loading effects of the belt torque and dynamic torque are in unison. In all embodiments, each spoke has an asymmetrical thickness that increases from a leading face to a trailing face thereof. The asymmetrical thickness increases from the leading face to the trailing face as a linear function, as a hyperbolic function, or as a parabolic function mirrored on opposing radial faces. In one aspect, the asymmetrical thickness increases from the leading face to the trailing face as a first linear function changing to a second linear function that is different than the first linear function mirrored on opposing radial faces. In another aspect, the asymmetrical thickness increases from the leading face to the trailing face as a nonlinear function changing to a linear function mirrored on opposing radial faces or as a linear function changing to a nonlinear function on opposing radial faces.

Also disclosed herein are engine systems that include a torsional vibration damper having a hub with one of the asymmetrical spoke designs mounted to a shaft for rotation therewith. In one aspect, the engine system is a front end accessory drive system and the shaft is a crankshaft.

BRIEF DESCRIPTION OF DRAWINGS

The patent or application file contains at least one figure executed in color. Copies of this patent or patent application publication with color figure(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION

Figure 1:
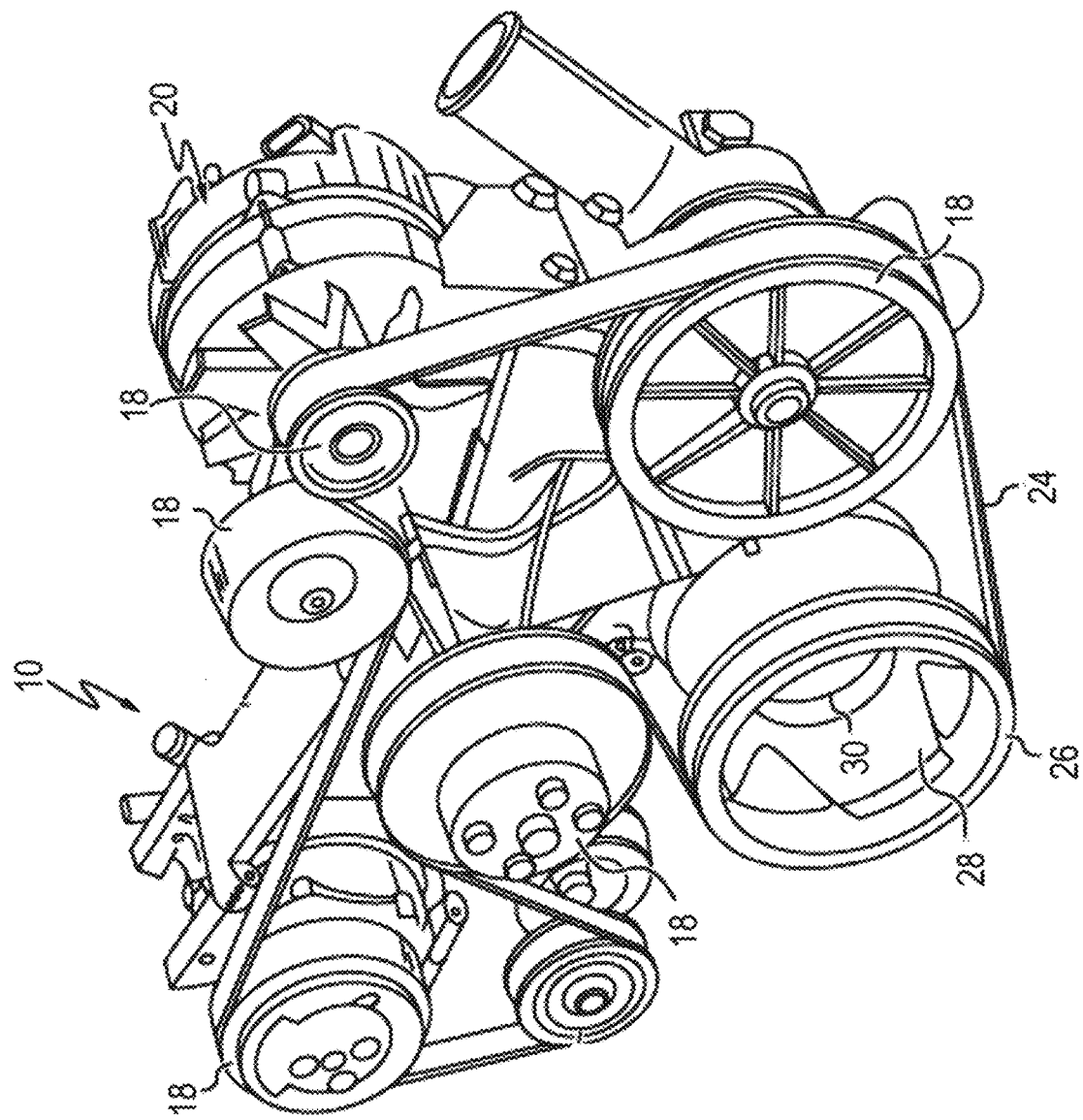
FIG. 1 is a perspective view of components in a front end accessory drive system.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Referring now to FIG. 1, an example embodiment of a front end accessory drive (FEAD) system 10 is shown, merely for illustrative purposes. The FEAD 10 is preferably mounted to an engine and may include a number of engine drive accessories 18, such as a vacuum pump, fuel injection pump, oil pump, water pump, power steering pump, air conditioning pump, alternator, belt-tensioner, or a cam drive, for example. The drive accessories 18 are driven by at least one endless drive belt 24, which is also engaged with a TVD 26 mounted to a nose 28 of the crankshaft 30. The crankshaft 30 drives the TVD 26 and thereby drives the endless drive belt 24, which in turn drives the remaining engine drive accessories 18 and the alternator 20.

Figure 2:
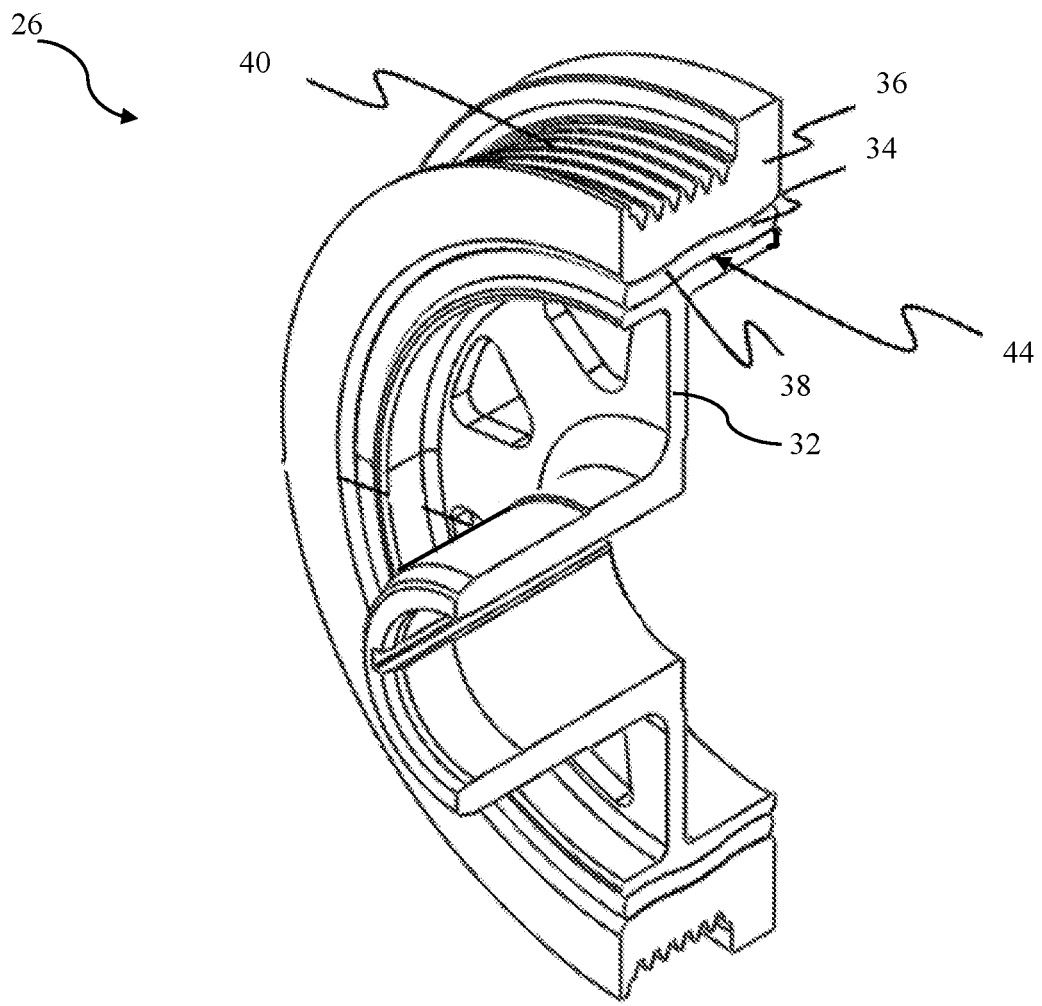
FIG. 2 is a perspective, longitudinal cross-sectional view of a prior art torsional vibration damper.

Referring now to FIG. 2, an example of one embodiment of a TVD 26 is shown for illustrative purposes. The TVD 26 includes a hub 32 operatively coupled to an inertia member 36 by a damper elastomeric member 34 to dampen and/or absorb the vibrational frequencies of the rotating hub 32 and of a crankshaft. The damper elastomeric member 34 and the inertia member 36 may be referred to herein collectively as a damper assembly 44. The TVD 26 may also include an isolator (not shown) to prevent transfer of rigid body mode vibrations of the crankshaft to the FEAD system.

The inertia member 36 is generally radially concentric about the hub 32 and spaced outward from the hub 32 such that the inertia member 36 and the hub 32 define a gap therebetween. The inertia member 36 (which may also be described herein as a pulley body) has an inner radial surface 38 for engagement with the damper elastomeric member 34 and a belt-engaging portion 40 for engagement with an endless drive belt such as the belt 24 in the FEAD system 10 of FIG. 1. The damper elastomeric member 34 may be press fit or injected into the gap defined between the inertia member 36 and the hub 32 so as to non-rigidly couple the hub 32 and the inertia member 36. The damper elastomeric member 34 may be as disclosed in U.S. Pat. No. 7,658,127, which is incorporated herein, in its entirety, by reference.

Figure 5:
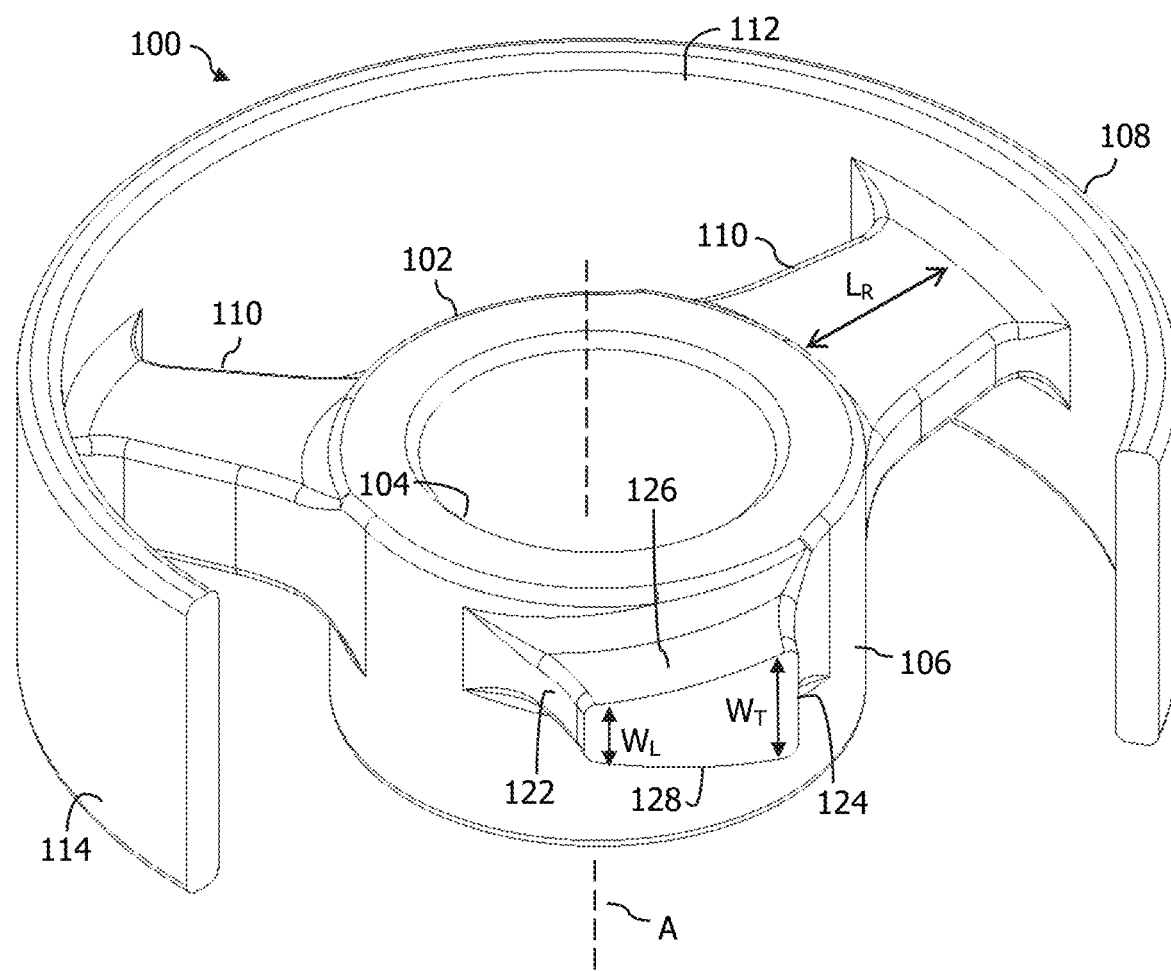
FIG. 5 is a perspective, sectional view through one asymmetrical spoke of a hub as a transverse cross-sectional view through the spoke relative to its radial length.

With reference to FIG. 5, hub 100 has a central member 102 having a central bore 104 and an outer radial surface 106. Also, hub 100 has a peripheral rim 108 generally radially concentric about the central member 102 and spaced radially outward therefrom, and a plurality of spokes 110 extending from the outer radial surface 106 of the central member 102 to an inner radial surface 112 of the peripheral rim 108. The hub 100 is mountable to a crankshaft (as shown in FIG. 1) by receiving the crankshaft through its central bore 104. The peripheral rim 108 has an outer radial surface 114 for engagement with a damper assembly, as shown in FIG. 2. The hub 100 may be cast, spun, forged, machined, or molded using known or hereinafter developed techniques, but is more preferably cast or forged. Suitable materials for the hub 100 include, but are not limited to, iron, steel, aluminum, other suitable metals, plastics, or a combination thereof, including composite materials. In one embodiment, the hub is gray cast iron.

Referring to FIG. 5, the plurality of spokes 110 may include two or more spokes that each have an asymmetrical thickness in an angular direction relative to the axis of rotation A, as evidenced by a cross-section view transverse to a radial length $L_R$ of each of the plurality of spokes. Each spoke 110 has a leading face 122 and a trailing face 124 with opposing radial faces 126, 128 extending therebetween. "Leading" and "trailing" are used herein with reference to the direction of rotation of the hub 100 about the axis of rotation A. The asymmetrical thickness is greatest where the loading effects of the belt torque and dynamic torque are in unison, which is typically more proximate the trailing face 124 of the spoke, and is identified as the trailing width $W_T$ of the spoke. Accordingly, the thickness of the spoke is less more proximate the leading face 122, and is identified as the leading width $W_L$. As shown in FIG. 5, the asymmetrical thickness or width of each spoke increases from the leading face 122 to the trailing face 124.

Figure 6A:
FIGS. 6A-6E are plan views of alternate transverse cross-sections through a spoke per the view in FIG. 5.
Figure 6B:
Figure 6C:
Figure 6D:
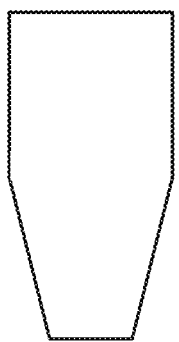
Figure 6E:
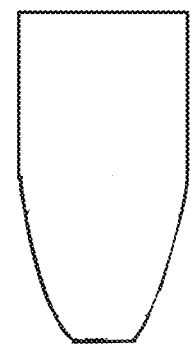

The asymmetrical thickness may increase from the leading face 122 to the trailing face 124 as a mathematical linear function, as a hyperbolic function, or as a parabolic function mirrored at the opposing radial faces 126, 128. As shown in FIG. 5 and FIG. 6A, the increase in the asymmetrical thickness may be according to a mathematical linear function that results in the cross-section having a trapezoidal shape. As shown in FIG. 6B, the increase in the asymmetrical thickness may be according to a mathematical hyperbolic function at the opposing radial faces 126, 128, or as shown in FIG. 6C, may be according to a mathematical parabolic function at the opposing radial faces 126, 128. In other embodiments, the asymmetrical thickness increases from the leading face 122 to the trailing face 124 as a first linear function that changes to a different second linear function mirrored on the opposing radial faces 126, 128 as shown in FIG. 6D. In yet other embodiments, the asymmetrical thickness increases from the leading face 122 to the trailing face 124 as a nonlinear function that changes to a linear function mirrored on opposing radial faces, as shown in FIG. 6E, or vice versa.

The spokes 110 disclosed herein are designed to withstand the loads applied by belt tension, belt torque, and dynamic torque. Dynamic torque is exerted by the inertia ring in resonance. The dynamic torque is bidirectional, and the belt torque is unidirectional. The torsional vibration damper experiences a greater tensile load where the belt torque and the dynamic torque complement each other compared to where the belt torque and the dynamic torque counteract each other. Brittle materials such as gray cast iron for conventional spokes (those of uniform thickness from the leading face to the trailing face) exhibit varying strengths in tension and compression, e.g., an ultimate tensile strength of 240 MPa and an ultimate compressive strength of 840 MPa. The ultimate compressive strength far exceeds the ultimate tensile strength; thus, the spokes need a greater tensile load in one direction—at the complement of the dynamic torque and belt torque. As explained above, this is accomplished with an asymmetrical spoke design having a greater thickness proximate the trailing face of each spoke, relative to the leading face of each spoke.

Figure 3:
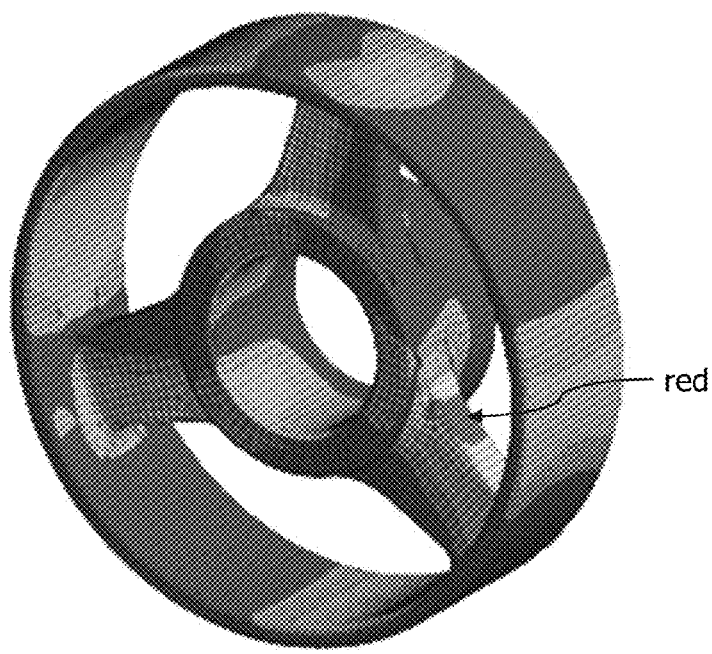
FIG. 3 is a 3D plot of a finite element model of a prior art hub having conventional spokes.
Figure 4:
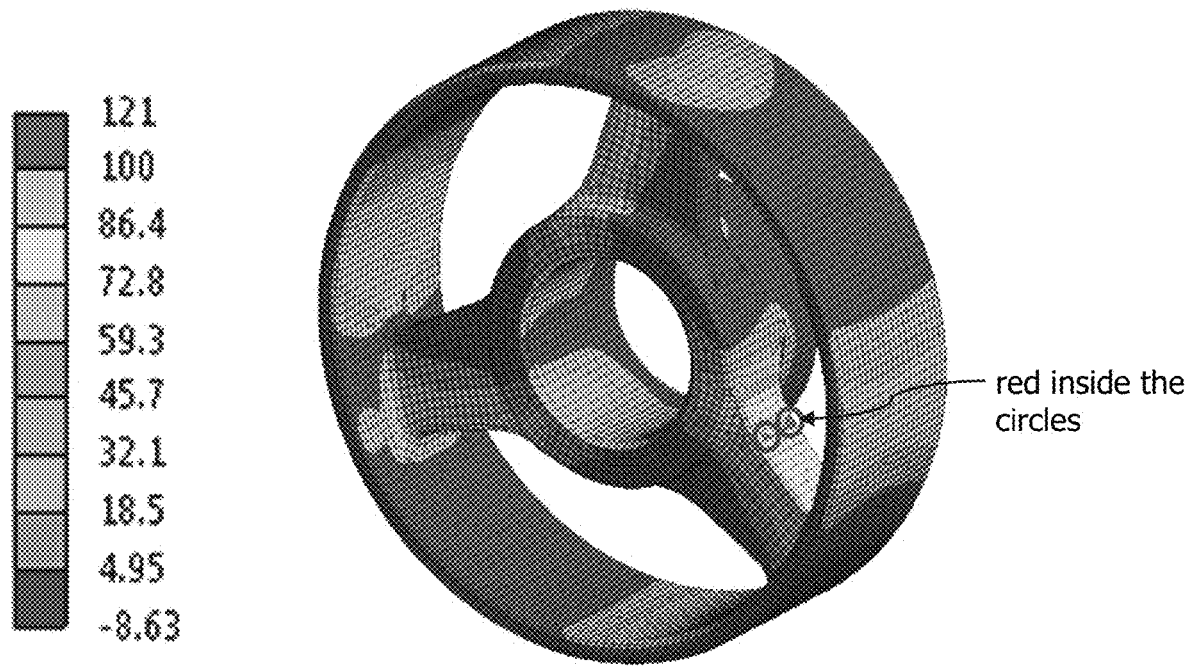
FIG. 4 is a 3D plot of a finite element model of a hub having asymmetric spokes as disclosed herein.

The comparative analysis presented in FIGS. 3 and 4 demonstrates the superior results of the spokes 110 having asymmetrical thickness. FIG. 3 is 3D finite element modeling of a hub having conventional spokes of uniform thickness, and FIG. 4 is 3D finite element modeling of a hub having the asymmetrical spoke design disclosed herein. The 3D finite element modeling in these figures is a representation of a maximum principal stress plot in MPa that has been normalized to 100 MPa for comparison. The maximum value for the conventional spoke in FIG. 3 is 121 MPa, which is indicated by the section of red on the trailing face of the spoke. There is much less red in the 3D finite element modeling of FIG. 4, and the maximum value is 103 MPa. If the hubs of FIG. 3 and FIG. 4 (and hence each TVD comprising the same) have the same mass, the asymmetrical spoke designs herein provide a hub that is nearly 15% stronger under combined belt torque and dynamic torque. If desired, the asymmetrical thickness is one way to actually reduce the mass of the TVDs (by using less material in the spokes) and still have a spoke with the structural integrity to handle the loads discussed above.

Although the invention is shown and described with respect to certain embodiments, it is obvious that modifications will occur to those skilled in the art upon reading and understanding the specification, and the present invention includes all such modifications.

What is claimed is:
1. A torsional vibration damper comprising:
a hub having a plurality of spokes radially spaced apart from each other a preselected distance defining voids therebetween and each extending from an outer radial surface of a central member to an inner radial surface of a peripheral rim, each of the plurality of spokes comprising:
- an asymmetrical thickness in an angular direction, as evidenced by a cross-section view transverse to a radial length of each of the plurality of spokes;
- wherein for each of the plurality of spokes, the asymmetrical thickness increases from a leading face to a trailing face and has a greatest thickness more proximate the trailing face; and
an inertia member concentric about the hub with an elastomeric member operatively positioned therebetween.

2. The torsional vibration damper of claim 1, wherein, for each of the plurality of spokes, the asymmetrical thickness increases from the leading face to the trailing face as a linear function, as a hyperbolic function, or as a parabolic function mirrored on opposing radial faces.

3. The torsional vibration damper of claim 1, wherein, for each of the plurality of spokes, the asymmetrical thickness increases from the leading face to the trailing face as a first linear function changing to a second linear function that is different than the first linear function mirrored on opposing radial faces.

4. The torsional vibration damper of claim 1, wherein, for each of the plurality of spokes, the asymmetrical thickness increases from the leading face to the trailing face as a nonlinear function changing to a linear function mirrored on opposing radial faces or as a linear function changing to a nonlinear function on opposing radial faces.

5. The torsional vibration damper of claim 1, wherein the hub comprises gray cast iron.

6. An engine system comprising:
a torsional vibration damper of claim 1 mounted to a shaft for rotation therewith.

7. A front end accessory drive system comprising:
a torsional vibration damper of claim 1 mounted to a crankshaft for rotation therewith.

8. A torsional vibration damper comprising:
a hub having a plurality of spokes radially spaced apart and extending from an outer radial surface of a central member to an inner radial surface of a peripheral rim, each of the plurality of spokes comprising:
- an asymmetrical thickness in an angular direction, as evidenced by a cross-section view transverse to a radial length of each of the plurality of spokes;
- wherein for each of the plurality of spokes, the asymmetrical thickness increases from a leading face to a trailing face and has a greatest thickness more proximate the trailing face; and
an inertia member concentric about the hub with an elastomeric member operatively positioned therebetween;
wherein, for each of the plurality of spokes, the asymmetrical thickness increases from the leading face to the trailing face as a linear function, as a hyperbolic function, or as a parabolic function mirrored on opposing radial faces.

9. A torsional vibration damper comprising:
a hub having a plurality of spokes radially spaced apart and extending from an outer radial surface of a central member to an inner radial surface of a peripheral rim, each of the plurality of spokes comprising:
- an asymmetrical thickness in an angular direction, as evidenced by a cross-section view transverse to a radial length of each of the plurality of spokes;
- wherein for each of the plurality of spokes, the asymmetrical thickness increases from a leading face to a trailing face and has a greatest thickness more proximate the trailing face; and
an inertia member concentric about the hub with an elastomeric member operatively positioned therebetween;
wherein, for each of the plurality of spokes, the asymmetrical thickness increases from the leading face to the trailing face as a first linear function changing to a second linear function that is different than the first linear function mirrored on opposing radial faces.

* * * * *